May 13, 1930.  G. E. BLAKE  1,758,214
AUTOMOBILE HEATER
Filed March 7, 1928  3 Sheets-Sheet 1
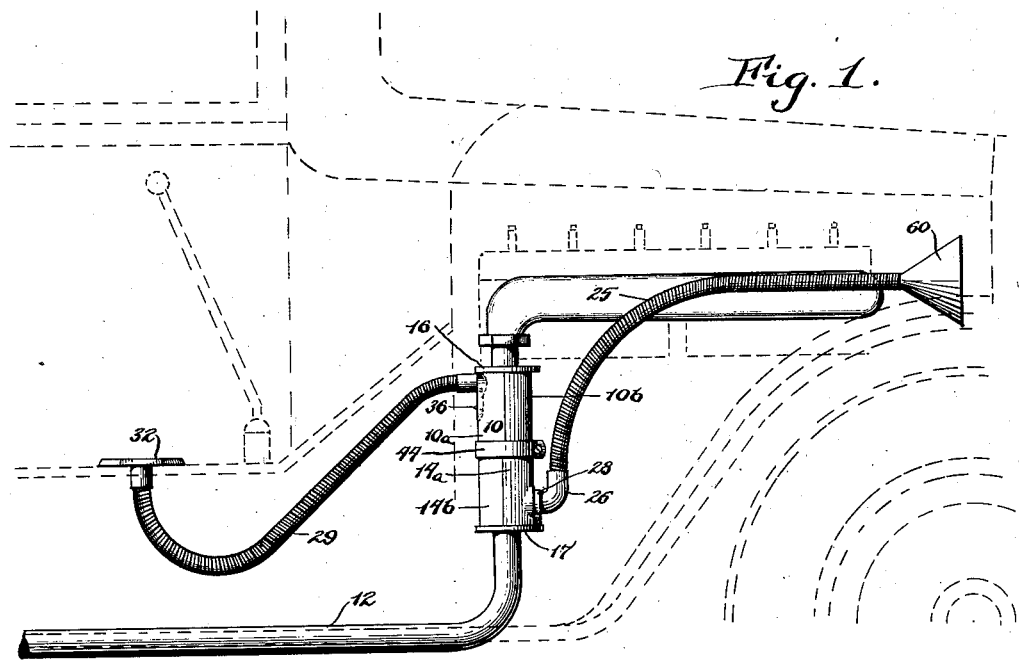
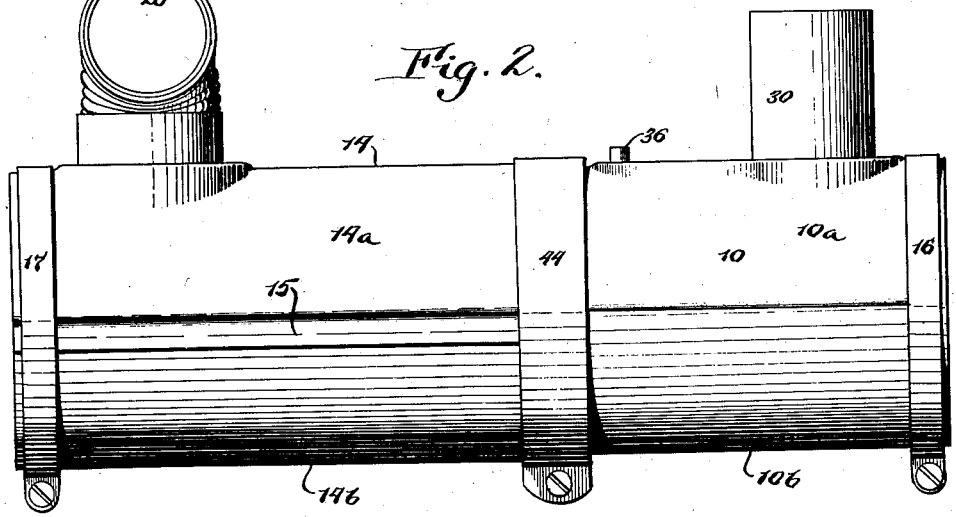
Inventor
George E. Blake
By Poppet Powers
Attorneys

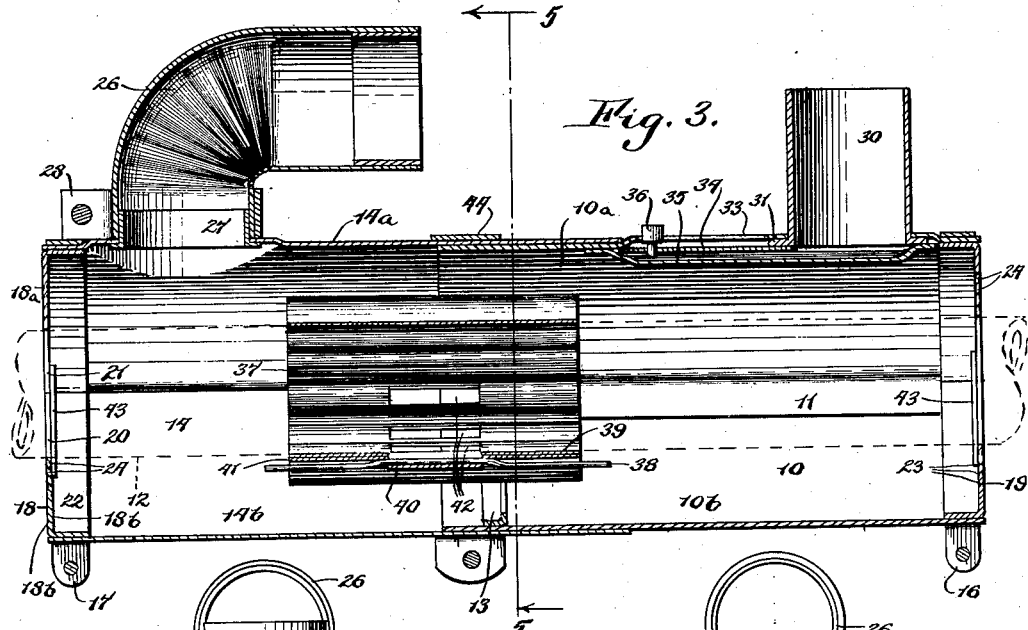
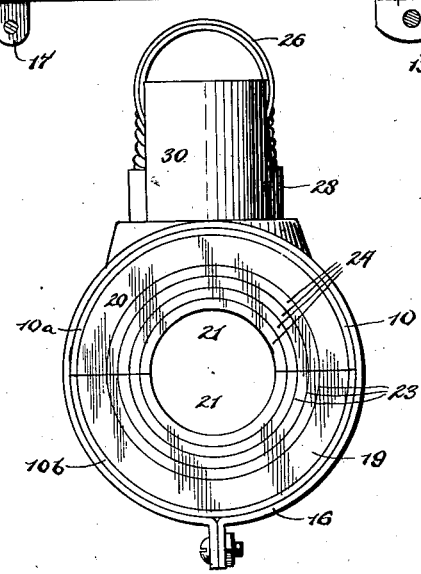
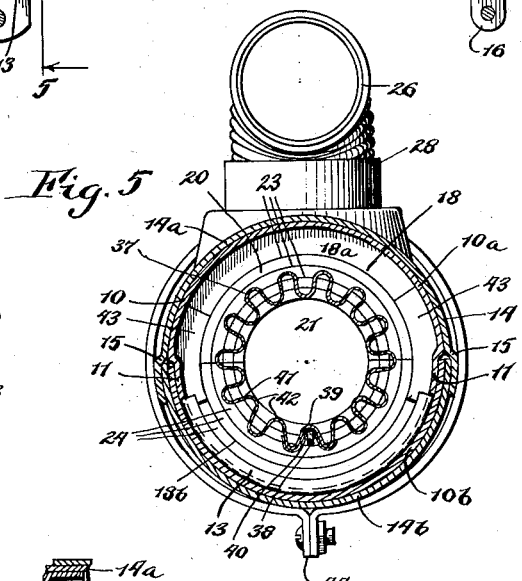
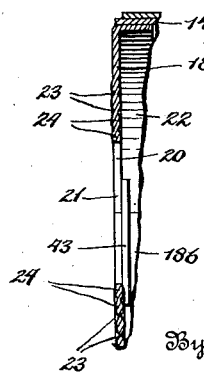

May 13, 1930.  G. E. BLAKE  1,758,214
AUTOMOBILE HEATER
Filed March 7, 1928    3 Sheets-Sheet 3
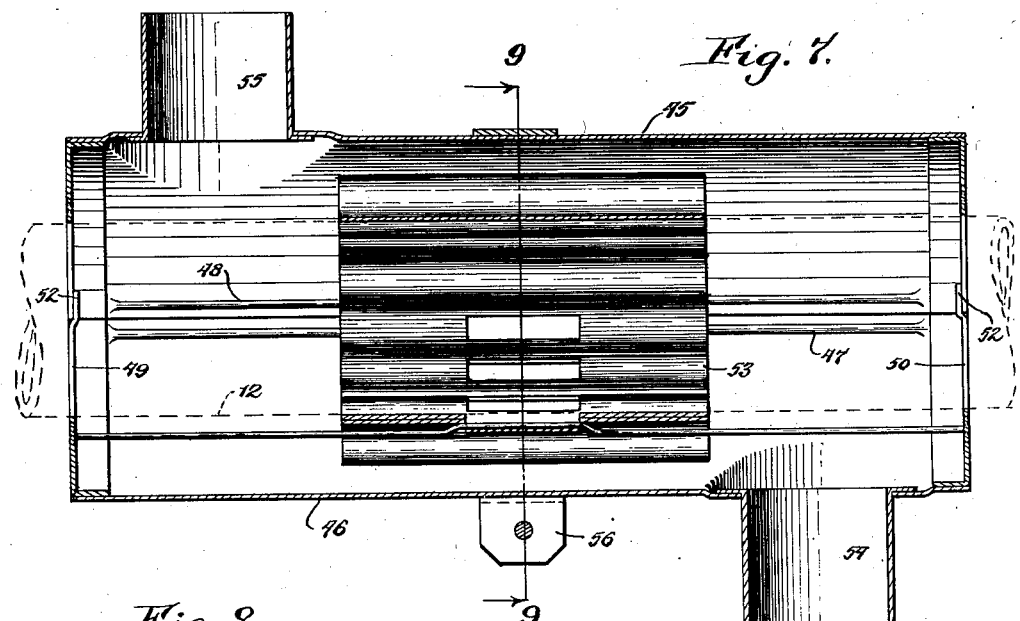
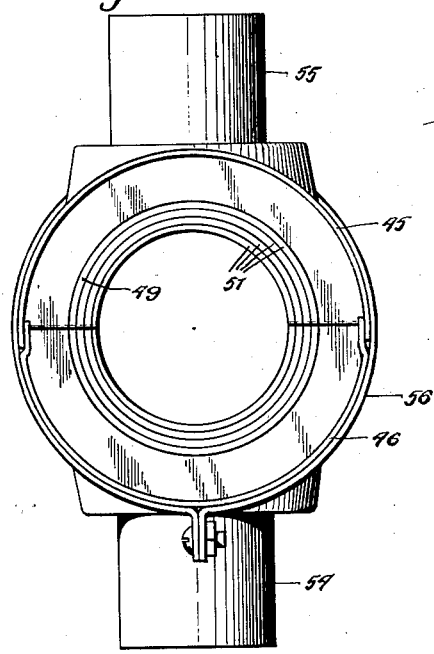
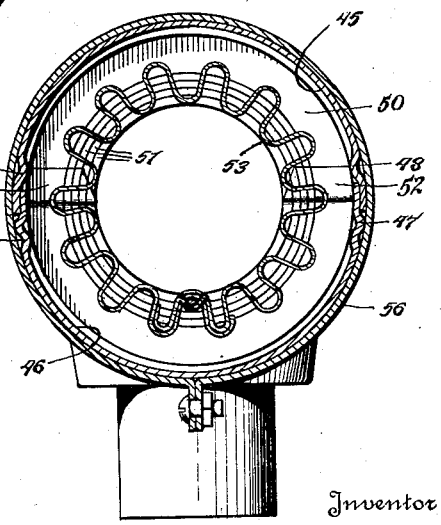
Inventor
George E. Blake
By Popp + Powers
Attorney Patented May 13, 1930

1,758,214

UNITED STATES PATENT OFFICE

GEORGE E. BLAKE, OF EAST AURORA, NEW YORK, ASSIGNOR TO FORSYTH METAL GOODS COMPANY INC., OF EAST AURORA, NEW YORK, A CORPORATION OF NEW YORK

AUTOMOBILE HEATER

Application filed March 7, 1928. Serial No. 259,688.

This invention relates to a heater and more particularly to an automobile exhaust heater in which the heat from the exhaust gases of the automobile engine is utilized for heating the exterior of the car, although the invention may also be employed in other analogous uses.

The principal object of this invention is to provide a heater of this character which will adequately and efficiently heat the car and which is adjustable to fit all standard automobiles in such manner as not to interfere with the free access to other parts of the machine.

A further object is to provide such a heater which can be quickly and readily installed and in which the adjustments required to fit the heater to different cars can be performed quickly and require no special skill.

Another aim is to provide a heater which when installed on the car will not be affected by the vibration and severe use to which automobile accessories are subjected and will operate to provide an abundant supply of hot air when needed and when cut out will have no heating effect.

A still further aim is to provide such a heater which is simple and inexpensive in construction and in which there is no danger of exhaust gases being conducted to the interior of the car body.

In the accompanying drawings:

Figure 1 is a side elevation of the heater installed on the exhaust pipe of an automobile and showing the manner in which the cold air inlet and the hot air outlet are mounted. Figure 2 is a side elevation of the preferred embodiment of my heater. Figure 3 is a longitudinal sectional view thereof showing the exhaust pipe in dotted lines. Figure 4 is an end view thereof. Figure 5 is a transverse sectional view taken on line 5—5, Fig. 3. Figure 6 is a fragmentary section through one head of the heater. Figure 7 is a longitudinal sectional view similar to Fig. 3 but showing a modified form of my invention. Figure 8 is an end view of the modified form shown in Fig. 7. Figure 9 is a transverse sectional view taken on line 9—9, Fig. 7.

Similar reference numerals refer to similar parts in each of the figures of the drawings.

In its general organization this invention comprises a telescopic heater each of the telescoping portions of which are of separable sections to permit of its being fitted to the exhaust pipe of the automobile without requiring removal of the pipe, a flexible cold air inlet tube connected with one of the telescopic portions, a flexible outlet tube connecting the other portion with a register in the car, an element on the exhaust pipe for retarding the flow of air through the heater and facilitating the transfer of heat, and means at the end heads of the heater for adapting the heads to exhaust pipes of different diameters.

In the preferred embodiment of the invention shown in Figs. 1-6, the inner or smaller telescopic portion 10 is composed of two semicylindrical sections $10^a$ and $10^b$, the longitudinal edges 11 of the section $10^a$ being offset inwardly to form a shoulder for the edges of the section $10^b$, as best shown in Fig. 5, thereby to limit the inward movement of these sections relative to each other. To further prevent collapsing of the sections when the same are installed on the exhaust pipe 12 a half ring 13 is welded on the inner side of the outer section $10^b$ and the ends of this ring form stop shoulders engaging the offset edges 11 of the inner section $10^a$.

The outer telescoping cylindrical portion 14 is made sufficiently large to fit over the inner end of the inner telescopic portion 10, and is similarly composed of two semicylindrical sections $14^a$ and $14^b$. The section $14^a$ is offset outwardly at its edges 15 to form stop shoulders engaging the edges of the outer section $14^b$ in the same manner as the inner telescopic portion 10. The two telescopic portions 10 and 14 therefore provide a heater casing which can be extended or shortened to adapt the heater to the space available in different automobiles or other conditions. The casing sections $10^a$ and $10^b$ are held together at their outer ends by a clamping ring 16 which embraces the same and a similar ring 17 embraces the outer ends of the sections $14^a$ and $14^b$ of the other telescopic portion 14. A third clamping ring 44 embraces both of the telescopic portions at their inner overlapping edges as indicated in Fig. 3 and thereby holds the inner ends of both of these sections together and also clamps the sections forming the outer telescopic portion 14 against the sections forming the inner telescopic portion 11, thereby holding the telescopic portions against relative longitudinal or rotary movement after the telescopic portions have been properly adjusted to meet the conditions imposed by the design of the car. It will be noted that by offsetting the shoulders 11 of the inner section 10ᵃ inwardly a relatively smooth cylindrical outer surface is provided on the inner telescopic portion 10, and a smooth cylindrical inner surface is provided on the outer telescopic portion 14 by offsetting the edges of the section 14ᵃ outwardly. By this means the heater is readily extended or contracted, and the telescopic portions thereof are also rotatable relative to each other.

A head 18 is provided at the outer end of the outer telescopic portion 14 and a similar head 19 is provided at the outer end of the inner telescopic portion 10, these heads being formed to provide circular openings and being fitted over the exhaust pipe 12 to form an enclosed heater casing. Inasmuch as these heads are identical in construction, a description of one will be deemed to apply to both.

The head 18 is made of two half sections 18ᵃ and 18ᵇ, each section being formed to provide a wall 20 having a semicircular opening 21, and to provide a semicircular flange 22 which projects inwardly and is welded to the inner side of the corresponding casing section, the half section 18ᵃ is secured to the casing section 14ᵃ and the half section 18ᵇ is secured to the casing section 14ᵇ. The ends of these sections abut against each other and thereby form a head having a circular opening for the exhaust pipe. To prevent longitudinal relative displacement of the casing sections, two stop pieces 43 are welded to the head section 18ᵃ of both heads and extend along the inner side of the other head section 18ᵇ.

To permit of the heads being fitted to exhaust pipes of different diameters, provision is made for permitting semicircular pieces to be readily chipped or torn out of each of the head sections at its exhaust pipe opening thereby enlarging this opening and adapting the heads to larger pipes. For this purpose each of these head sections is made of a metal of low tensile strength, and is provided on its inner and outer sides with a plurality of indentations 23 which are arranged concentrically with the exhaust pipe openings as best shown in Figs. 4 and 6. The corresponding indentations on opposite sides of each head section are equidistant from the exhaust pipe opening and therefore from thin webs connecting relatively thick beads 24. The beads of the corresponding head sections register with each other as best shown in Fig. 4 so that upon removing successive beads of both sections, the circular shape of the exhaust pipe opening will be maintained. In manufacturing the heater, the diameter of the exhaust opening provided in the heads is made sufficiently small to fit the smallest size of exhaust pipe for which it is designed, and a table such as the following is preferably provided to aid the owner of the car or mechanic in determining how many semicircular beads or rings should be removed to fit any exhaust pipe:

For 1½″ exhaust pipe use present hole;
For 1⅝″ exhaust pipe remove 1 ring;
For 1¾″ exhaust pipe remove 2 rings;
For 1⅞″ exhaust pipe remove 3 rings;
For 2 1/16″ exhaust pipe remove 4 rings.

The rings or beads are readily torn from the head by gripping the rings successively with a pair of pliers and tearing the web connecting it to the next succeeding ring or bead.

Cold air is conducted to the heater casing by a flexible tube 25 which is suitably connected to an elbow inlet pipe 26. This elbow is mounted for rotary movement on the section 14ᵃ of the heater casing and for this purpose one end of the elbow abuts against the outer side of the casing, and a flanged ring 27 is arranged within the elbow, the flange thereof extending laterally outward and engaging the inner side of the casing. The elbow and flanged ring are held together by a clamping ring 28. The flexible inlet tube 25 preferably extends along the side of the motor as shown in Fig. 1, and is secured to the neck of a funnel 60 which opens forwardly toward the fan and thereby causes a pressure to be built up in the inlet tube.

The air after being heated by its passage through the heater casing and around the exhaust pipe is conducted to the interior of the car body through a flexible tube 29 which is suitably connected to an outlet pipe 30. This outlet pipe extends through an opening provided in the side of the casing section 14ᵃ and is provided with a flange 31 which is welded to the casing. This outlet tube 29 is connected at its other end to a register 32 which is mounted on the floor of the car and is preferably provided with closure means (not shown) for regulating the amount of hot air delivered.

It will be noted that the heater can be extended or contracted to adapt it to varying conditions, and the telescopic portions can also be rotated relative to one another to position the inlet and outlet pipes in such manner as space conditions favor, and by providing a swiveled inlet elbow, the same may be moved to a position which renders long curving bends in the flexible inlet pipe unnecessary. It will also be understood that either of the pipe connections on the heater may be used as an inlet or as an outlet, thereby further facilitating its installation.

To cut off all heat from the outlet tube, or to permanently regulate the heat delivered by the register, an opening 33 is provided in the casing section 10ᵃ adjacent the outlet opening, and a slide 34 is held against the underside of the casing by a friction bridge piece 35. This slide is adapted to cover the opening 33 and is also movable to cover the adjacent outlet opening by means of a finger piece 36 projecting upwardly through the opening 33. When it is desired to cut off the flow of air through the outlet the slide is moved over the outlet opening and the hot air from the heater then escapes from the heater through the opening 33. It is also apparent that in any intermediate position, part of the hot air will escape through the outlet and part will escape through the opening 33.

To facilitate the transfer of heat from the exhaust pipe to the passing air, and also to retard the flow of air, a heating element composed of a strip 37 of corrugated sheet metal is bent around the exhaust pipe, and the free ends of the same are joined together by a wire key 38. The corrugations of this strip run parallel with the exhaust pipe, and the last inner corrugation 39 at one end of the strip has an outwardly extending open ended ridge 40 provided therein. To receive this ridge, the inner corrugations 41 at the other end of the strip are provided with openings 42. The ridge extends through one of these openings and the wire key extends along the exterior of the element and through the ridge as best shown in Fig. 3, and thereby holds the ends of the strip together. To prevent loss of the key, the same is offset at its center, the offset portion being arranged in the ridge and therefore permitting the key to be removed or inserted only by forcing the same endwise. By the provision of a plurality of openings in the inner corrugations, the locking ridge can be engaged by any one of them and the corrugated strip may therefore be freely expanded or contracted to fit exhaust pipes of different diameters.

The modified form of the invention shown in Figs. 7–9 is designed to provide a less expensive heater for Ford cars and other popular cars. This heater includes two semicylindrical casing sections 45 and 46, the lower section 46 being provided with a ridge 47 which forms a stop shoulder for the overlapping edge of the upper section and the upper section 45 being provided with a similar ridge 48 forming a stop shoulder for the upper edge of the lower section. This heater is also formed with sectional heads 49 and 50, each head having removable beads 51 to adapt it to different sizes of exhaust pipes, as in the preferred form. Longitudinal displacement of the sections is preferably prevented by offsetting the upper ends 52 of the lower half section of each head 49 and 50, these offset ends engaging the inner sides of the lower ends of each upper half section. A corrugated element 53 is secured to the exhaust pipe similarly to the element in the preferred construction, and functions to absorb heat from the pipe and to transfer it to the air. An inlet pipe 54 is welded to one section and an outlet 55 to the other and these are connected to flexible inlet and outlet tubes as in the preferred construction. The two sections are securely clamped to the exhaust pipe by a clamping ring 56.

As a whole this invention provides a heater which is very simple and inexpensive in construction, it operates efficiently to heat the car and will not readily get out of order and is quickly applied to cars having different sizes of exhaust pipes and having different conditions to be met in installing an exhaust heater.

I claim as my invention:

1. A heater including a casing composed of two sections adapted to embrace a supporting member, each of said sections being recessed, said recesses being in register and forming an opening adapted to receive said supporting member, and each of said sections being indented to form a series of beads adjacent said opening and conforming to the shape thereof, said beads being connected to one another along their entire length by webs formed by the indentations and said beads being thereby adapted to be torn from said sections to enlarge said opening for receiving supporting members of different sizes.

2. An automobile exhaust heater including a casing composed of two sections adapted to embrace the exhaust pipe, semicircular heads provided on each of said sections, each of said heads being provided with semicircular openings, the corresponding openings registering with each other and forming circular holes for receiving said exhaust pipe, each of said head sections being indented to form a series of beads adjacent to said opening, said beads being concentric with said opening, said beads being connected to one another along their entire length by webs formed by the indentations and being adapted to be torn from said head section thereby to enlarge said holes to adapt them to exhaust pipes of different diameters.

3. An automobile exhaust heater including a casing composed of a pair of telescopic cylindrical portions, each of said portions including a pair of semicylindrical sheet metal sections, the longitudinal edges of one of the sections of the inner telescopic portion being offset inwardly to form a stop shoulder for the edges of its companion section and the longitudinal edges of one of the sections of the outer telescopic portion being offset outwardly to form a stop shoulder for the edges of its companion section, thereby to provide telescopic sections having relatively smooth cylindrical engaging surfaces to permit relative longitudinal and rotary movement thereof, an air inlet and an air outlet for said casing, and means for holding said sections in an adjusted position.

4. An automobile exhaust heater including a casing surrounding an exhaust pipe, an air inlet and an air outlet for said casing, a strip of corrugated metal arranged in said casing and embracing said exhaust pipe, and means for adjustably fastening the ends of said strip together whereby said strip is adapted to embrace exhaust pipes of different diameters.

5. An automobile exhaust heater including a casing surrounding an exhaust pipe, an air inlet at one end of said casing, an air outlet at the other end of said casing, a strip of corrugated metal arranged in said casing and embracing said exhaust pipe, the corrugations of said strip running parallel with said exhaust pipe, and the inner corrugations at one end of said casing being provided with openings, and one of the inner corrugations at the other end of said strip being formed to provide an outwardly projecting ridge adapted to project through any one of said openings at the other end of said strip, and a wire key arranged exteriorly of said strip and extending through said ridge thereby to hold the ends of said strip together.

In testimony whereof I affix my signature.

GEORGE E. BLAKE.